United States Patent [19]
Buysman et al.

[11] Patent Number: 5,626,447
[45] Date of Patent: May 6, 1997

[54] BELT REFURBISHING METHOD AND APPARATUS

[76] Inventors: Jeffrey L. Buysman, 1911 Eleanor St., Worthington, Minn. 56187; Thomas E. Bomgaars, R.R. 1, Box 25, Worthington, Minn. 56187

[21] Appl. No.: 306,009

[22] Filed: Sep. 14, 1994

[51] Int. Cl.[6] ............................................. B23C 3/13
[52] U.S. Cl. ......................... 409/139; 409/157; 409/161; 409/228
[58] Field of Search ..................... 409/132, 137, 409/139, 140, 157, 161, 173, 228, 169; 29/81.02, 81.05; 72/40

[56] References Cited

U.S. PATENT DOCUMENTS

| | | | |
|---|---|---|---|
| 684,485 | 10/1901 | Webster | 409/139 |
| 2,071,619 | 2/1937 | Fiegel | 409/157 |
| 2,327,531 | 8/1943 | Koch | 409/157 |
| 2,736,145 | 2/1956 | Davidson | 409/140 |
| 3,791,258 | 2/1974 | Krall et al. | 409/139 |
| 4,534,687 | 8/1985 | Hetz | 409/161 |

*Primary Examiner*—Daniel W. Howell
*Attorney, Agent, or Firm*—Nawrocki, Rooney & Sivertson, P.A.

[57] ABSTRACT

Apparatus and method for refurbishing damaged belting. The apparatus includes a frame with a conveyor system. A mechanism is attached to the frame for removing a desired amount of the belting surface as the belting moves relative to the frame on the conveyor system.

7 Claims, 3 Drawing Sheets

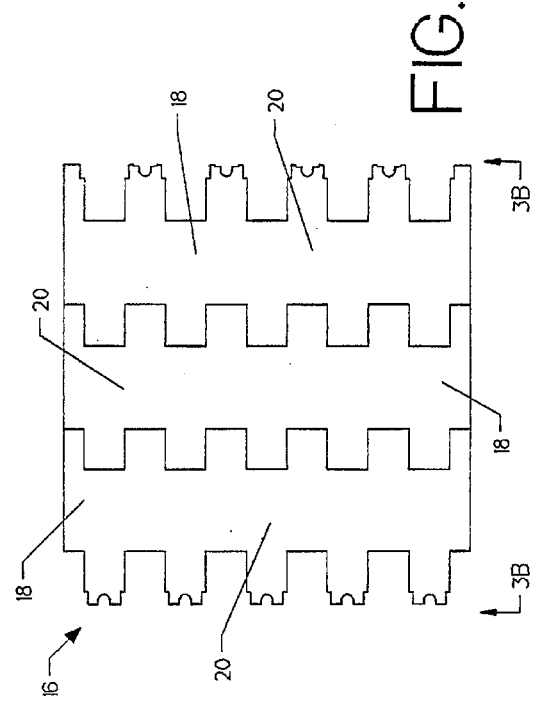
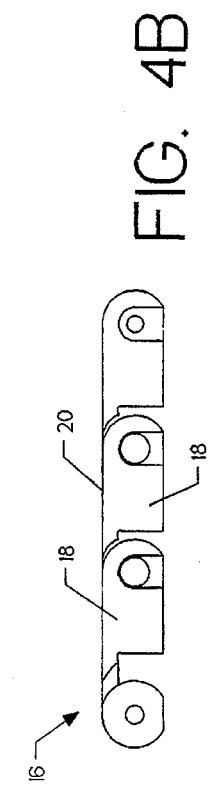
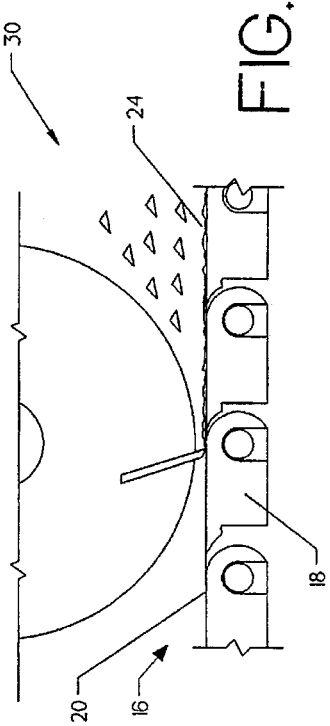
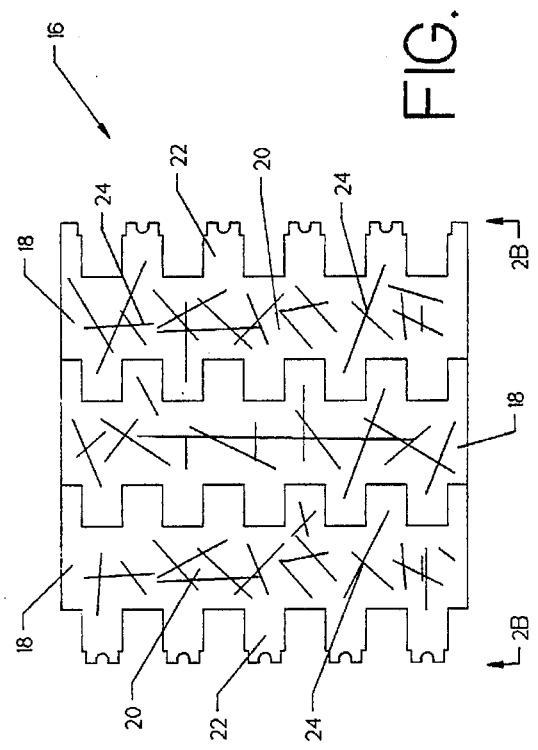
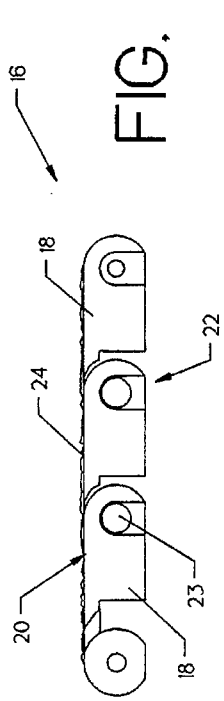
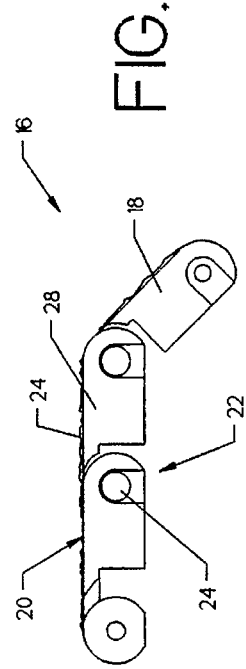

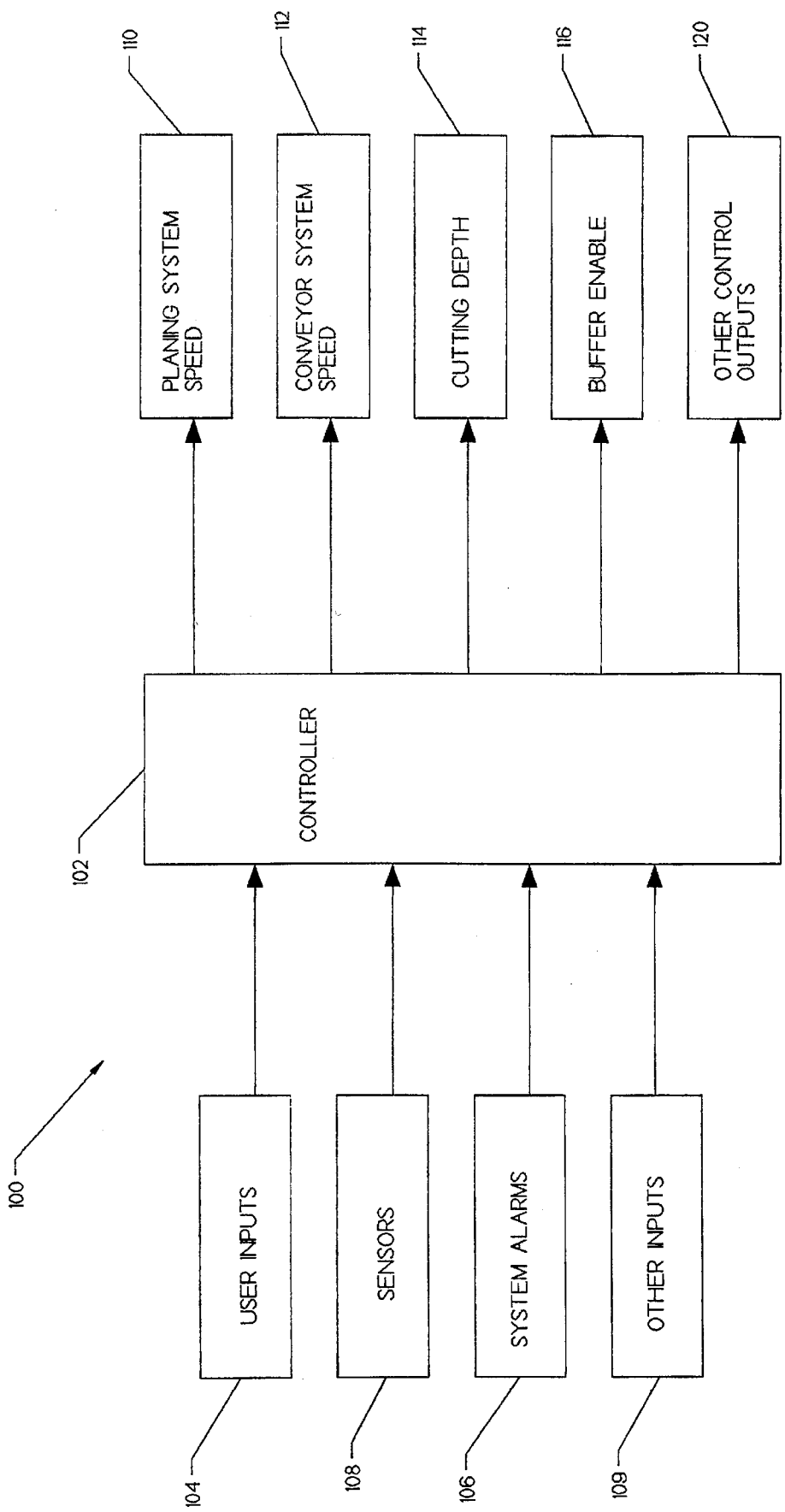

BELT REFURBISHING METHOD AND APPARATUS

FIELD OF THE INVENTION

The present invention relates to an apparatus for refurbishing industrial belting. In particular, the present invention relates to an apparatus which refurbishes expensive modular conveyor belting for reuse in the food industry.

BACKGROUND OF THE INVENTION

In industry, conveyor systems are used for transporting products between various industrial process stations. In particular, food industry conveyor systems use belting for transporting food product during food processing.

In the food processing industry, raw food product is transported on conveyor systems using modular belting. The modular belting is formed from universally shaped injection-molded plastic modules which have generally smooth and impervious surfaces. The belting modules are flexibly connected together to form desired lengths and widths of conveyor belting.

The cost of modular belting is very expensive, and increases with belt size. Modular belting is used in the food processing industry because it meets U.S. Department of Agriculture (USDA) and other regulatory sanitary and cleanliness requirements. Food processes are inspected on a daily basis by USDA representatives to insure the processes are meeting federal regulations.

After a period of use, the modular belting surface is no longer smooth and impervious. Modular belting becomes damaged from knife scribes and return carriers in the form of cuts and scraps in the belt surfaces. The damaged modular belt surfaces no longer meet USDA inspection requirements and federal regulations since the damaged surfaces may be susceptible to the build-up of bacteria and other organisms. In the past, the only alternative was to discard the damaged belting and replace it at a very expensive cost.

SUMMARY OF THE INVENTION

The present invention is an apparatus and method for refurbishing conveyor belting. Particularly, the present invention relates to an apparatus and method for refurbishing expensive modular conveyor belting for reuse in the food industry.

In one embodiment, the present invention includes an apparatus for refurbishing belting which has a damaged portion. The apparatus includes a frame and a conveyor system. A mechanism is attached to the frame for removing a desired amount of the belting as the belting moves relative to the frame on the conveyor system.

The mechanism for removing a desired amount of the belting surface may include a selectively rotatable, generally cylindrically shaped member having at least one blade extending from a longitudinal surface thereof. The mechanism for removing a desired amount of the belting may also be accomplished by other mechanical, electrical or chemical means, such as the use of a drum sander.

Additionally, the mechanism for removing a desired amount of the belting surface may include a mechanism for applying uniform pressure to the belting surface. The mechanism for applying pressure to the belting surface may include a pair of pressure hold down devices located on each side of the apparatus frame. Additionally, the apparatus may include a mechanism for discharging belting removed.

The belt refurbishing apparatus may also include a mechanism for adjusting the vertical position of the belting surface relative to the mechanism for removing a desired amount of the belting surface.

In a preferred embodiment, the present invention includes a system for refurbishing modular belting used on conveyor systems in the food processing industry, the modular belting having a damaged surface. The refurbishing system includes a frame with a conveyor bed passing through the frame. A mechanism is attached to the conveyor bed for selectively moving the damaged modular belting on the conveyor bed relative to the frame. A mechanism is also attached to the frame for removing a desired amount of the damaged surface of the modular belting as the belting moves through the frame.

Additionally, a control mechanism is included for controlling the amount of surface removed, by adjusting the position of the conveyor bed relative to the mechanism for removing the belting surface.

In one embodiment, the removal mechanism includes a mechanism for planing the modular belting surface having at least one rotating blade. Alternatively, the removal mechanism may include a drum sander.

Additionally, the system may include a mechanism for buffing the conveyor belting after the damaged surface has been removed; a mechanism for selectively imparting a drag force on the modular belting to aid in removing the belting surface; a mechanism for adjusting the conveyor frame to accommodate different widths and lengths of the conveyor belting; and a mechanism for applying uniform pressure to the modular belting surface.

In yet another embodiment, the present invention may include a control mechanism for varying the speed of movement of the conveyor bed relative to the frame, and a control mechanism for varying the speed of planing the belting surface.

The present invention refurbishes modular conveyor belting for reuse, which in the past was discarded and replaced at an expensive cost. The modular belting may be refurbished a number of times, depending upon the amount of belting removed.

BRIEF DESCRIPTION OF THE DRAWINGS

The invention will be further described with reference to accompanying drawings where like numbers refer to like parts in several views and wherein:

FIG. 2A is a plan view of a portion of damaged modular belting shown in FIG. 1;

FIG. 2B is an end view of the portion of damaged modular belting shown in FIG. 2A;

FIG. 2C is an end view of the damaged modular belting of FIGS. 2A and 2B shown in an alternate position;

FIG. 3 is a partial view showing planing of a modular belting surface in accordance with the belt refurbishing apparatus of the present invention;

FIG. 4A is a plan view of a portion of refurbished modular belting;

FIG. 4B is an end view of the portion of refurbished modular belting shown in 4A; and FIG. 5 is a control diagram which includes a graphic representation of input signals and output signals in accordance with one embodiment of the present invention.

DETAILED DESCRIPTION OF THE PREFERRED EMBODIMENTS

Figure 1:
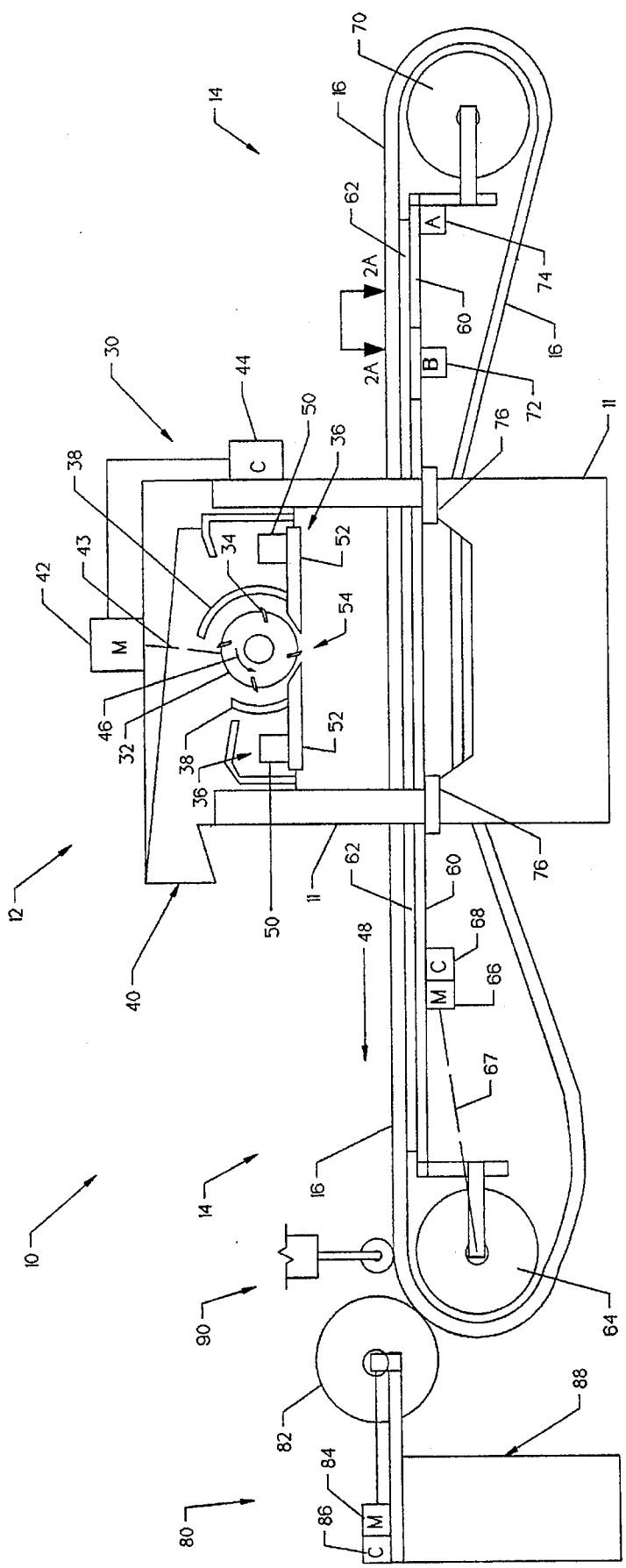
FIG. 1 is a diagrammatic view of a belt refurbishing apparatus in accordance with the present invention.

The present invention relates generally to an apparatus for refurbishing industrial belting used in conveyor systems.

Particularly, modular belting used on conveyor systems in the food processing industry becomes damaged after a period of use. In the past, when the damaged belting no longer met federal regulations for use, the belting was discarded and replaced at an expensive cost. The present invention refurbishes damaged modular belting to its previous smooth and impervious form, which meets federal regulations for reuse in the food industry, at a fraction of the replacement cost.

FIG. 1 shows a belt refurbishing system in accordance with the present invention generally at 10. The belt refurbishing system 10 generally includes a surface removal system 12 and a conveyor system 14. In general, the conveyor system 14 carries damaged belting which is to be refurbished through the surface removal system 12 for removing the damaged belting surface.

The belting to be refurbished is shown generally at 16 on conveyor system 14. In one preferred embodiment, the belting 16 is modular belting which is generally used in the food processing industry. A portion of the modular belting 16 is shown in FIGS. 2A, 2B and 2C. As shown in FIG. 2A, belting 16 includes modules 18 which are rotatably connected together. Modules 18 are formed from injection molded plastic material, such as acetal, polyurethane, polyethylene, acetal polyethylene blends, or similar materials. The modules 18, such as those commonly manufactured by Rexnord, Intralox, Falcon, Cambridge, etc. are universally formed to fit most food industry conveying systems.

The modules 18 include a top surface 20 and hinge extensions 22. The modules are flexibly connected together by passing a pin (not shown) through corresponding hinge extensions 22 and securing the pin in place with a fastener 23. As shown in FIG. 2C, belting formed of modules 18 is flexible at hinge extensions 22.

Belting 16 may be provided in various widths and lengths. Belting widths range up to any useable width. Accordingly, to achieve wider belt widths, manufacturers commonly combine a combination of modules 18.

Top surface 20 is a molded surface which is generally flat. In the food processing industry, as the modular belting 16 carries raw food through various process stations, the modular belting 16 top surface 20 becomes damaged from knife scribes and return carriers in the form of cuts and scrapes on the top surface shown generally at 24.

The damaged top surface 24 may be susceptible to the build-up of bacteria and other organisms. Food processes undergo daily inspections for meeting federal sanitary requirements. When the belting 16 is damaged to the point that it no longer meets federal regulations, in the past, the only alternative was to discard the damaged belt and replace it at a very expensive cost.

The present belt refurbishing invention 10 removes the damaged portion 24 of the top surface 20. Top surface 20 is once again smooth, and suitable for use on food industry conveying systems.

Referring to FIG. 1, surface removal system 12 is securely attached to frame 11. Surface removal system 12 removes the damaged portion 24 of top surface 20, restoring belting 16 in condition for reuse.

In a preferred embodiment shown in FIG. 1, surface removal system 12 includes a belt planing system 30.

Planing system 30 includes a planing drum 32 having blades 34, pressure devices 36, damaged belting discharge chute 40, motor 42, and controller 44.

Planing drum 32 is rotatably connected within frame 11. Planing drum 32 is generally cylindrically shaped with blades 34 extending from planing drum 32 along its longitudinal surface. Blades 34 are secured within planing drum 32, with the amount of blades 34 extending from planing drum 32 being adjustable. In a preferred embodiment as shown in FIG. 1, four blades 34 are equally spaced along the cylindrical surface of planing drum 32.

Planing drum 32 is mechanically coupled (43) to motor 42 for rotating at a desired speed as indicated by directional arrow 46. The rotation of planing drum 32 is controlled by controller 44. Controller 44 controls the starting and stopping of planing drum 32. Additionally, motor 42 may include a variable frequency drive coupled to planing drum 32, which allows controller 44 to also control the speed of rotation of planing drum 32.

In operation, as the damaged belting 16 moves past planing drum 32, indicated by directional arrow 48, a pair of pressure devices 36 apply uniform pressure to the top surface of belting 16. Pressure devices 36 include pressure hold down bars 50 and pressure plates 52. Pressure plates 52 have a width which is greater or equal to the width of belting 16. In operation, pressure plates 52 are in contact with the top surface of belting 16. Pressure hold down bars 50 are located above pressure plates 52 and secured to frame 11. Pressure hold down bars 50 adjust the amount of uniform pressure applied to belting 16.

Pressure devices 36 keep belting 16 from buckling as belting 16 passes through planing system 30. Pressure devices 36 are located on each side of planing drum 32, and are spaced a distance apart which is generally less then the width of a module 18. As shown at 54, as blades 34 rotate, they extend between pressure devices 36 for cutting the top surface 20 of belting 16.

Additionally, guards 38 are located around planing drum 32. Guards 38 provide safety protection from blades 34 and also a conduit for blades 34 to throw removed belting material into the damaged belting discharge area 40.

In one embodiment, the damaged belting discharge 40 is connected to a vacuum for collecting the damaged belting material at a central location. The collected damaged belting bi-product is in a form suitable for recycling. The belting bi-product may be melted down and used again for injection molded processes.

The present invention provides advantages over past wasteful industry practices. In the past, when damaged belting no longer met inspection requirements, it was discarded and was in a form too large for easy recycling. With the advantages of the present invention, the belting is refurbished for reuse, and the damaged belting bi-product is recyclable for use in other injection molded products.

Conveyor system 14 moves belting 16 through frame 11 for removal of the damaged top surface 24 by surface removal system 24. Conveyor system 14 includes conveyor bed 60, conveyor bed surface 62, pull through drive sprocket 64, motor 66, control 68, brake spool 70, conveyor bed length adjustment 72, and surface removal adjustment 74.

Conveyor bed 60 extends through frame 11 and is securely attached and supported by frame 11. Alternatively, conveyor bed 60 may extend through frame 11, or be located next to frame 11, and be supported by the process floor.

Conveyor bed 60 has a conveyor bed surface 62. Conveyor bed surface 62 is formed of a material which will not damage the belting 16 passing over the conveyor bed surface 62, and which has a low coefficient of friction between the conveyor bed surface 62 and belting 16. In one embodiment, conveyor bed surface 62 is formed of plastic or a material similar to the belting 16.

Conveyor bed 60 is secured to frame 11, indicated at 76. Drive sprocket 64 is located at one end of conveyor bed 60 and brake spool 70 is located at an opposite end of conveyor end 60. Belting 16 is loaded onto conveyor bed 60 and around drive sprocket 64 and brake spool 70 as shown in FIG. 1.

Drive sprocket 64 pulls the belting 16 through surface removal system 12 over the conveyor bed 60. If necessary, drive sprocket 64 may be easily changed out to accommodate a specific manufacturer's type of belting, since conveyor drive sprockets for each type of belting all have a common universal bolt system. Drive sprocket 64 is mechanically coupled (67) to motor 66 which drives drive sprocket 64. Controller 68 allows for control of drive sprocket 64, such as start and stop operations. In one embodiment, motor 66 includes a variable frequency drive coupled to drive sprocket 64 for varying the speed of conveyor belting 16. With the variable frequency drive, an operator is able to adjust the speed of the conveyor system 14 at controller 68.

Brake spool 70 is rotatably attached to the conveyor bed 60 at the opposite end of the drive sprocket 64. Brake spool 70 follows drive sprocket 64 for guiding belting 16 across conveyor bed 60. Additionally, brake spool 70 imparts an adjustable drag force on belting 16 to keep the belting 16 tight to the conveyor bed surface 62, and to keep belting 16 from buckling as it moves through surface removal system 12.

The amount of damaged top surface which needs to be removed varies from belting to belting, depending upon how deep the cuts and scrapes are into the belting 16. The present invention provides for precision adjustment of the amount of top surface to be removed by surface removal system 12. In a preferred embodiment, the planing drum 32 remains stationary within the surface removal system 12 and the amount of top surface to be removed is adjusted by conveyor bed surface removal adjustment 74. Surface removal adjustment 74 provides for precision adjustment of conveyor bed 60 in a vertical direction. Additionally, surface removal adjustment 74 provides a leveling adjustment of conveyor bed 60. Alternatively, it is recognized that conveyor bed 60 could remain stationary and the amount of top surface removed would be adjusted by adjusting removal system 12 planing system 30.

Additionally, the length of conveyor bed 60 may be adjusted by conveyor bed length adjustment 72. The conveyor bed length adjustment 72 adjusts conveyor bed 60 to accommodate different sized belting or to take up excess belting after the belting 16 is loaded onto the conveyor bed 60.

FIG. 3 shows a close-up partial view of the belt refurbishing 10 planing system 30 in operation (pressure devices 36 and guards 38 not shown). As shown, planing system 30 planes away the undesirable damaged top surface 24 of belting 16, resulting in the smooth top surface 20 as shown in FIGS. 4A and 4B. The resulting top surface is smooth and impervious, free of any knife cuts or scraps. Additionally, the belt refurbishing system 10 of the present invention provides a truer cut surface than the originally molded belting 16, which was generally flat.

The present invention allows plastic modular belting to be refurbished a number of times. Since the surface removal adjustment 74 allows fine adjustment of the amount of surface to be removed, where the surface cuts are not very deep, only a small portion of the surface, as is necessary, is removed. Since the top surface 20 of the belting modules are relatively thick, belting 16 may be refurbished a number of times into a condition acceptable for reuse in process conveyor systems.

Referring to FIG. 1, an additional buffer system, shown at 80, may also be used for providing a smooth buffed finish to the refurbished belting 16. The buffer system 80 includes a flap wheel buffer 82, a motor 84, a controller 86, and a support system 88.

Flap wheel buffer 82 is supported by support system 88. Flap wheel buffer 82 may be selectively adjusted to come in contact with belting 16 after it has passed through surface removal system 12. Flap wheel buffer 82 is mechanically coupled to motor 84 and is controlled by controller 86. Motor 84 rotates flap wheel buffer 82 for buffing and shining the top surface 20 of belting 16. It is recognized that buffer system 80 does not have to remain in continuous contact with belting 16, but rather be controlled to contact belting 16 when desired.

It may be necessary that the belting be sanitized or disinfected prior to refurbishing or after refurbishing. In one embodiment, a belt washer is used to clean the modular belting. The belt washer may include a series of nozzles or spray jets for pressure cleaning of the belting. Additionally, a chemical sanitizer, such as a chloride based solution, may be used for sanitizing and disinfecting the belting.

It is also recognized that the present invention, shown in FIG. 1 set up to refurbish a continuous loop of belting 16, could be used as a continuous feed belt refurbishing system. In this operation, a rubber drum roller system 90 may be located above drive sprocket 64 to retain belting 16 against drive sprocket 64.

Additionally, it is recognized that the belt refurbishing system 10 is operable as a portable unit, and could be located at the end of an existing conveyor system to be refurbished. In such an operation, the conveyor belting would simply be fed from the existing conveyor system onto the belt refurbishing system for surface removal and returned to the conveyor system.

It is also recognized that the damaged surface to be removed could be removed in one pass through the surface removal system 12, or accomplished through multiple passes through the surface removal system 12. Additionally, planing system 30 may include one blade or a number of blades, or may include additional planing drums for multiple cutting of top surface 20. In one embodiment, the speed of the cutters is variable and also the speed at which the conveyor system moves the belting through the surface removal system 12.

Additionally, as shown in FIG. 5, the belt refurbishing system 10 may be incorporated into a process having a centralized control system as shown generally at 100. In one embodiment, the centralized control system 100 includes a controller 102. The controller 102 includes a mechanism capable of forming logical operations, such as a sequence of logic gates, switches, a computer or other microprocessor based process control unit. Controller 102 provides for manual or automatic operation of belt refurbishing system 10. Controller 102 accepts user inputs 104, such as desired cutting speed, conveyor speed, cutting depth, belt tension, belt drive tension, and buffer system enable. Additionally, controller 102 accepts system alarms 106, other sensors 108, and other inputs 109. In response, the controller 102 automatically controls the belt refurbishing system 10 by providing timed outputs 110, 112, 114, 116, and 120.

It is also recognized that other systems may be used for surface removal system 12 while still remaining within the scope of the present invention. For example, it is contemplated that the surface removal system 12 may include a drum sander for removing portions of damaged top surface 24. Although the use of a drum sander is contemplated, a planing system is preferred due to the inherent problems associated with sanding plastic molded materials. It is recognized that with the use of a drum sander, the plastic belting is more susceptible to warping, a true surface may not be achieved, and a fine adjustment of the portion to be removed may not be accomplished.

Additionally, the belt refurbishing system of the present invention is able to remove damaged portions on the side of the modular belting by using a side surface removal device such as a planer or circulating blade mechanism similar to a table saw.

It is recognized that the present invention may be used to refurbish almost any type of industrial belting formed of plastic, rubber, or similar materials. Additionally, the belt refurbishing process may be used as a preliminary step to resurface damaged belting by applying an additional substrate over the refurbished belting.

The belt refurbishing system of the present invention provides an economical and efficient apparatus and method for removing the damaged top surface of plastic modular belting commonly used on the conveyor systems in the food processing industry. With the use of the present invention, costly plastic modular belting no longer need be discarded when damaged, but may be repeatedly refurbished for use while meeting federal regulations.

It will be understood that this disclosure is, in many respects, only illustrative. Changes may be made in details, particularly in matters of shape, size, material, and arrangement of parts, without exceeding the scope of the invention. Accordingly, the scope of the invention is as defined in the language of the appended claims.

What is claimed is:

1. A system for refurbishing modular belting used on conveyor systems in the food processing industry, the modular belting having a damaged surface, the system comprising:
   a. a frame;
   b. conveyor means for selectively moving the modular belting on the conveyor bed relative to the frame; and
   c. means attached to the frame for selectively removing a desired amount of the surface of the modular belting as the belting moves relative to the frame on the conveyor means;
   d. means for adjusting the conveyor frame to accommodate different widths and lengths of conveyor belting.
2. The system of claim 1, including:
   a. control means for controlling the amount of surface removed by adjusting the position of the conveyor bed relative to the means for selectively removing a desired amount of the surface of the modular belting.
3. The system of claim 1, wherein the removal means includes:
   a. means for planing the modular belting surface having at least one rotating blade.
4. The system of claim 1, further including:
   a. means coupled to the conveyor means for selectively imparting a drag force on the modular belting.
5. The system of claim 1, further including:
   a. means for applying generally uniform pressure to the modular belting surface as it passes below the removal means.
6. The system of claim 1, further including:
   a. means coupled to the conveyor means for selectively varying the speed at which the modular belting moves relative to the frame.
7. The system of claim 1, further including:
   a. control means coupled to the surface removing means for selectively varying the speed of removal of the desired amount of surface.

* * * * *